United States Patent
Agarwal et al.

(10) Patent No.: US 9,430,420 B2
(45) Date of Patent: Aug. 30, 2016

(54) COMPUTING SYSTEM WITH MULTIMODAL INTERACTION MECHANISM AND METHOD OF OPERATION THEREOF

(71) Applicant: Telenav, Inc., Sunnyvale, CA (US)

(72) Inventors: Rajeev Agarwal, Fremont, CA (US); Gregory Stewart Aist, San Mateo, CA (US); Aliasgar Mumtaz Husain, Milpitas, CA (US); Weiying Li, Cupertino, CA (US)

(73) Assignee: Telenav, Inc., Santa Clara, CA (US)

(*) Notice: Subject to any disclaimer, the term of this patent is extended or adjusted under 35 U.S.C. 154(b) by 0 days.

(21) Appl. No.: 14/108,690

(22) Filed: Dec. 17, 2013

(65) Prior Publication Data

US 2014/0195700 A1     Jul. 10, 2014

Related U.S. Application Data

(60) Provisional application No. 61/749,537, filed on Jan. 7, 2013.

(51) Int. Cl.
*G06F 3/00* (2006.01)
*B60Q 1/26* (2006.01)
*G06F 13/26* (2006.01)
*G06F 9/48* (2006.01)

(52) U.S. Cl.
CPC .............. *G06F 13/26* (2013.01); *G06F 9/4812* (2013.01)

(58) Field of Classification Search
CPC ........... G06F 2203/0381; G06F 3/048; G06F 9/4812
See application file for complete search history.

(56) References Cited

U.S. PATENT DOCUMENTS

| | | | |
|---|---|---|---|
| 7,383,189 B2 | 6/2008 | Halonen et al. | |
| 8,082,153 B2 | 12/2011 | Coffman et al. | |
| 8,311,835 B2 | 11/2012 | Lecoeuche | |
| 8,374,879 B2 | 2/2013 | Falcon et al. | |
| 8,566,026 B2 * | 10/2013 | Bouve | 701/411 |
| 8,615,359 B2 * | 12/2013 | Alam et al. | 701/410 |
| 2003/0046401 A1 | 3/2003 | Abbott et al. | |
| 2005/0010418 A1 | 1/2005 | McNair et al. | |
| 2006/0122840 A1 | 6/2006 | Anderson et al. | |
| 2010/0182140 A1 * | 7/2010 | Kohno et al. | 340/438 |
| 2011/0169632 A1 * | 7/2011 | Walker et al. | 340/539.13 |
| 2013/0010830 A1 * | 1/2013 | Hori | H04W 16/14 375/133 |

* cited by examiner

*Primary Examiner* — Hyun Nam
(74) *Attorney, Agent, or Firm* — IP Investment Law Group (57) ABSTRACT

A method of operation of a computing system includes: receiving a interrupt request for an interrupt task request; determining a request intent, with a control unit, from the interrupt request; generating a system notification for the interrupt task request based on the request intent; and determining a presentation order of the system notification relative to an existing system notification based on a notification priority associated with the interrupt task request.

21 Claims, 6 Drawing Sheets

COMPUTING SYSTEM WITH MULTIMODAL INTERACTION MECHANISM AND METHOD OF OPERATION THEREOF

CROSS-REFERENCE TO RELATED APPLICATION(S)

This application claims the benefit of U.S. Provisional Patent Application Ser. No. 61/749,537 filed Jan. 7, 2013, and the subject matter thereof is incorporated herein by reference thereto.

TECHNICAL FIELD

The present invention relates generally to a computing system, and more particularly to a system with multimodal interaction mechanism.

BACKGROUND ART

Modern portable consumer and industrial electronics, especially client devices such as computing systems, navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Computing systems, including navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a computing system without multimodal interaction mechanism has become a paramount concern for the consumer. The inability decreases the benefit of using the tool.

Thus, a need still remains for a computing system with multimodal interaction mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a computing system including: receiving a interrupt request for an interrupt task request; determining a request intent, with a control unit, from the interrupt request; generating a system notification for the interrupt task request based on the request intent; and determining a presentation order of the system notification relative to an existing system notification based on a notification priority associated with the interrupt task request.

An embodiment of the present invention provides a computing system, including: a control unit for: receiving a interrupt request for an interrupt task request; determining a request intent, with a control unit, from the interrupt request; generating a system notification for the interrupt task request based on the request intent; determining a presentation order of the system notification relative to an existing system notification based on a notification priority associated with the interrupt task request; and a user interface, coupled to the control unit, for presenting the system notification.

An embodiment of the present invention provides a non-transitory computer readable medium including instructions for operating a computing system including: receiving an interrupt request for an interrupt task request; determining a request intent, with a control unit, from the interrupt request; generating a system notification for the interrupt task request based on the request intent; and determining a presentation order of the system notification relative to an existing system notification based on a notification priority associated with the interrupt task request.

Certain embodiments of the invention have other steps or elements in addition to or in place of those mentioned above. The steps or element will become apparent to those skilled in the art from a reading of the following detailed description when taken with reference to the accompanying drawings.

DETAILED DESCRIPTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the computing system 100 are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

The computing system 100 can be or include a navigation system 100. One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Figure 1:
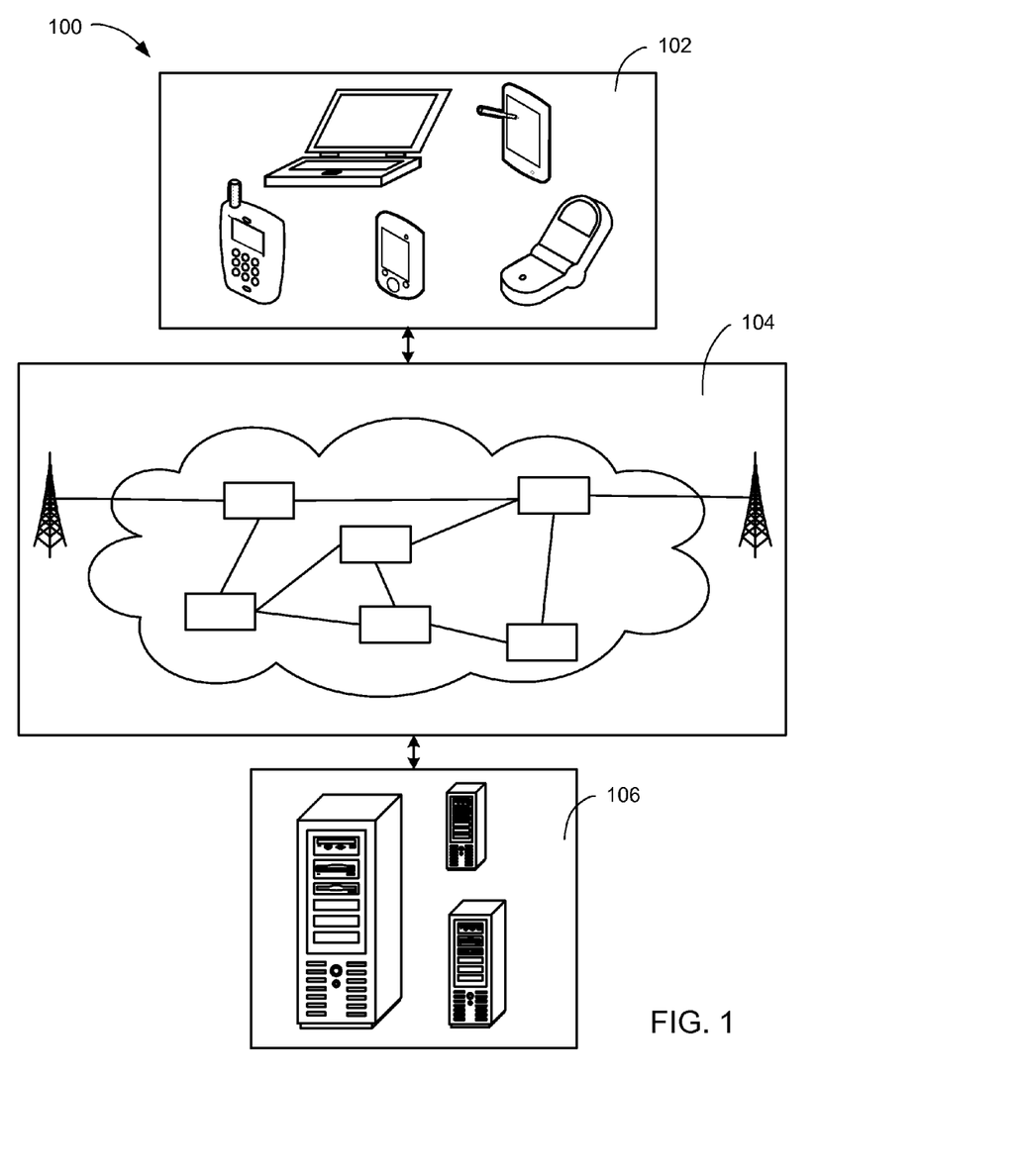
FIG. 1 is a computing system with multimodal interaction mechanism in an embodiment of the present invention.

Referring now to FIG. 1, therein is shown a computing system 100 with multimodal interaction in an embodiment of the present invention. The computing system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the computing system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can be a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
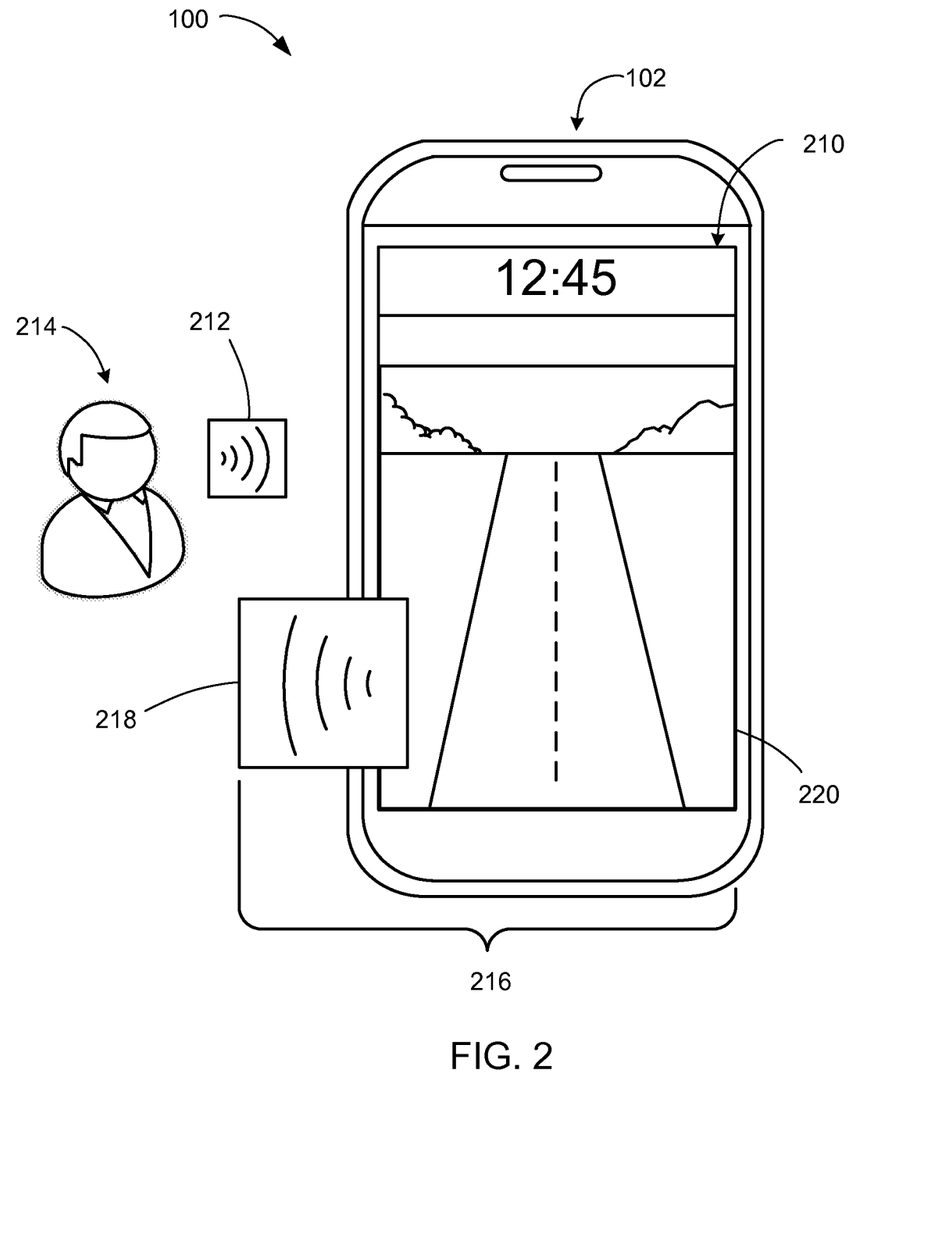
FIG. 2 is an example of a device interface of the first device of FIG. 1.

Referring now to FIG. 2, therein is shown an example of a device interface 210 of the first device 102 of FIG. 1. FIG. 2 depicted the first device 102 receiving an interrupt task request 212 from a task requestor 214. The interrupt task request 212 is defined as a request that can interrupt or suspend current interaction with the computing system. For example, the interrupt task request 212 can be a request that can interrupt a system notification 216 for a previous task request that is being presented at the time the interrupt task request 212 is made by the task requestor 214.

The system notification 216 is defined as an interaction or notification by the system associated a request. For example, the system notification 216 can include a proactive or unsolicited notification related to the interrupt task request 212 or a previous request, a status or progress updates for the interrupt task request 212, request to clarify or refine the interrupt task request 212, a response or answer to the interrupt task request 212, or a combination thereof.

The system notification 216 can include a visual component 220, an audio component 218, or a combination thereof. For example, the system notification 216 can include primarily or only the audio component 218 when it is appropriate for primarily audio notifications, such as when the notification content 560 can be presented without visual accompaniment. As a specific example, when the interrupt task request 212 is an inquiry for accidents along a route, the system notification 216 can include only the audio component 218 that states "there are no accidents along the route to your destination" when there are no accidents or traffic.

In another example, the system notification 216 can include primarily or only the visual component 220 when it is appropriate for primarily visual notifications, such as when the notification content 560 can be presented without audio accompaniment. As a specific example, when the interrupt task request 212 is a request to view a route, the system notification 216 can present only the visual component 220 to include a visual depiction of the entire route without including the audio component 218.

In a further example, the system notification 216 can include a combination of the visual component 220 and the audio component 218 in a complementary or non-redundant presentation. As a specific example, when the interrupt task request 212 is a request to view a route, the system notification 216 include both the audio component 218 and the visual component 220 with the visual component 220 depicting the entire route and the audio component 218 stating "The route to your destination is clear" or "Your estimated arrival time is 6:35 pm." In another specific example, when driving over the speed limit, the system notification 216 can be a proactive or unsolicited notification with complementary presentation of the audio component 218, which states "slow down" or "exceeding the speed limit," and the visual component 220, which can flash red to indicate speeding or the current speed flashing on a display of the device interface 210.

Figure 3:
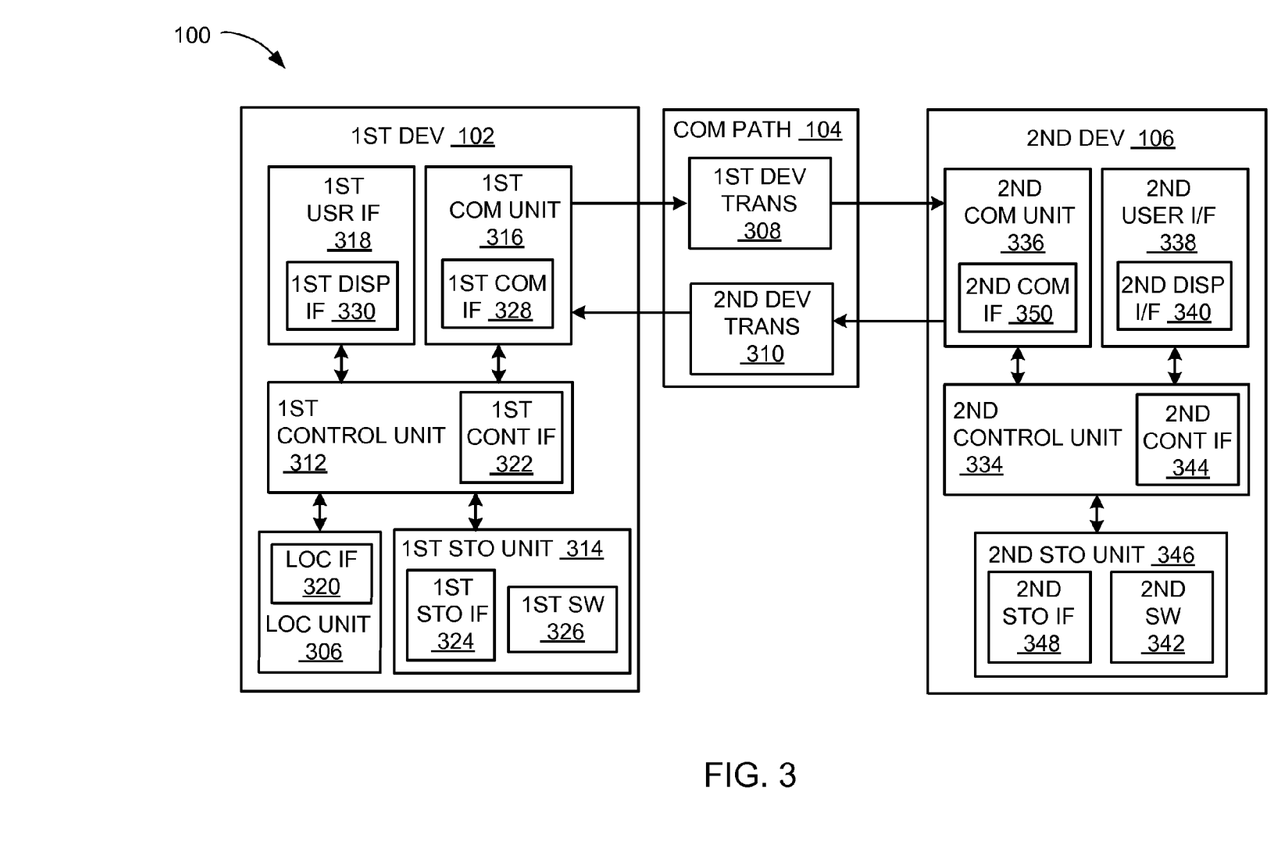
FIG. 3 an exemplary block diagram of the computing system.

Referring now to FIG. 3, therein is shown an exemplary block diagram of the computing system 100. The computing system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the computing system 100 is shown with the first device 102 as a client device, although it is understood that the computing system 100 can have the first device 102 as a different type of device. For example, the first device 102 can be a server.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the computing system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs. The first user interface 318 can include the device interface 210 of FIG. 2.

The first user interface 318 can include a first display interface 330. The first display interface 330 can include a display, a projector, a video screen, a speaker, or any combination thereof.

The first control unit 312 can operate the first user interface 318 to display information generated by the computing system 100. The first control unit 312 can also execute the first software 326 for the other functions of the computing system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The computing system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100. For example, the first device 102 is described to operate the location unit 320, although it is understood that the second device 106 can also operate the location unit 320.

Figure 4:
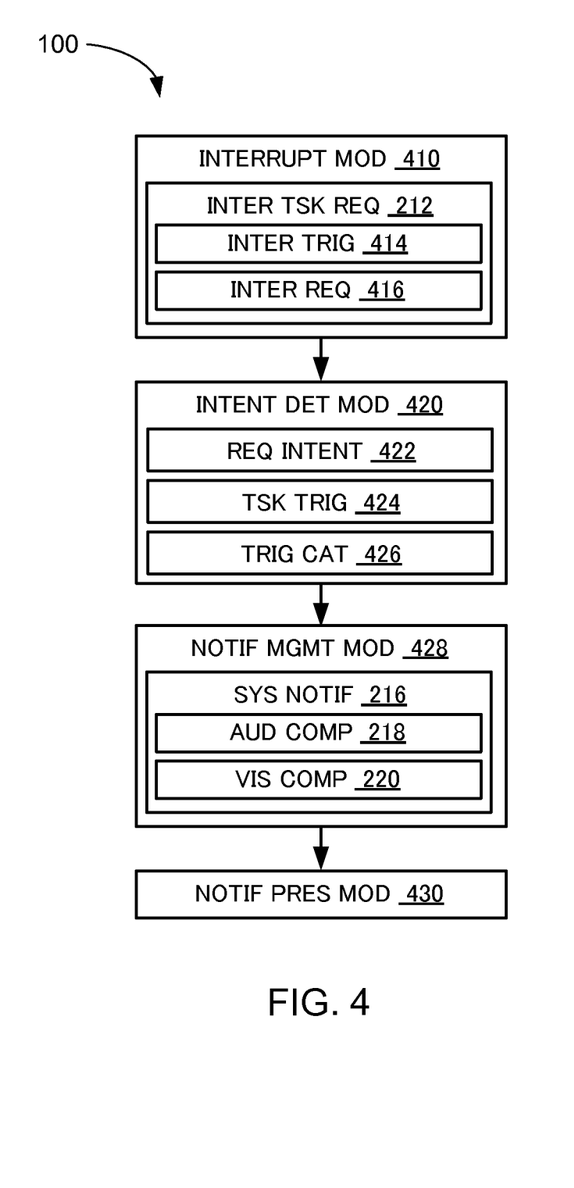
FIG. 4 is a control flow of the computing system.

Referring now to FIG. 4, therein is shown a control flow of the computing system 100. The computing system 100 can include an interrupt module 410. The interrupt module 410 is for pausing or suspending current notification process to receive and determine the content of the request. The interrupt module 410 can interrupt, pause, or suspend a notification that is currently or actively being presented by the computing system 100 at the time the interrupt task request 212 is made by the task requestor of FIG. 2.

The interrupt module 410 can receive the interrupt task request 212 with an interrupt trigger 414. The interrupt trigger 414 is defined as a designated sound, spoken word, or phrase for initiating a request or interaction with the system. For example, the interrupt trigger 414 can be a sound, a word, or phrase by the task requestor 214 that interrupts, pauses, or suspend the system notification 216 for a previous task request that is being presented at the time the interrupt task request 212 is made. As a specific example, the interrupt trigger 414 can be a pre-determined or default word or phrase, such as "Interrupt" or "New request". In another specific example, the interrupt trigger 414 can be a word or phrase designated by the task requestor 214, such as "Hello Computer".

The interrupt trigger 414 can be made by the task requestor 214 through audio or voice activation, such as through the first user interface of FIG. 3. For example, the task requestor 214 can initiate the interrupt task request 212 solely through voice commands of the interrupt trigger 414 without physical or visual interaction with the first device 102.

The interrupt module 410 can interrupt, pause, suspend, or cancel a notification that is currently or actively being presented to receive the interrupt task request 212 based on recognition or identification of the interrupt trigger 414. For example, the interrupt module 410 can monitor the sounds or words uttered by the task requestor 214 to recognize or identify the interrupt trigger 414. As a specific example, the interrupt module 410 can use speech recognition to identify or recognize the interrupt trigger 414 when spoken by the task requestor 214.

When the interrupt module 410 recognizes or identifies the interrupt trigger 414, the interrupt module 410 can pause or suspend any notifications currently being presented to receive the interrupt task request 212. For example, if the computing system 100 is presenting the audio component 218 of one instance of existing notifications 542 for a previous instance of the interrupt task request 212, the interrupt module 410 can pause or suspend the presentation of the existing notifications 542 to receive the interrupt task request 212.

The interrupt module 410 can receive an interrupt request 416 of the interrupt task request 212 following identification or recognition of the interrupt trigger 414. The interrupt request 416 is defined as the words, sounds, or a combination thereof, received by the system that is the request made by the user. For example, the interrupt request 416 can be the actual words and sounds received by the computing system 100 associated that the task requestor 214 intends to accomplish or the purpose of the request. As a specific example, when the task requestor 214 asks "Hello Computer, is it raining in San Francisco?" as the interrupt task request 212, the interrupt module 410 can identify the interrupt trigger 414 as "Hello Computer" and determine the interrupt request 416 as "is it raining in San Francisco?"

The computing system 100 can include an intent determination module 420 coupled to the interrupt module 410. The intent determination module 420 is for identifying words or phrases in the content of a request to determine the task the requestor intends to accomplish or the purpose of the request. For example, the intent determination module 420 can determine a request intent 422 from the interrupt request 416 of the interrupt task request 212.

The request intent 422 is defined as the task the requestor intends to accomplish or the purpose of the request. The request intent 422 can include specific or general tasks or operations that are both within the scope of what the computing system 100 can and cannot execute. For example, the request intent 422 can be determined to include tasks that can be within the scope of executable tasks by the computing system 100, such as a request for the time it will take to reach a location, the amount of traffic along a route, or for alternative navigation options to a location. In another example, the request intent 422 can be determined to include requests that can be outside the scope of the executable tasks by the computing system 100, such as the current amount of funds in the bank account of the task requestor 214, or the menu price of a specific item at a particular restaurant. As a specific example, the scope of what the computing system 100 can or cannot execute can be determined by the availability of or access to information by the computing system 100.

The intent determination module 420 can determine the request intent 422 with task triggers 424. The task triggers 424 are defined as a specific word, group of words, a phrase, or phrases, which indicates the intent or purpose of the request. For example the task triggers 424 can be specific words or phrases in the interrupt request 416 that can be used by the intent determination module 420 to indicate or determine the task or operation the task requestor 214 intends to accomplish or the purpose of the interrupt task request 212. As a specific example, the task triggers 424 can be words that indicate a request for action or question, such as "is it", "call", "what is", "how long", "find", or "tell me." To continue the example, the task triggers 424 can be words that indicate the people, places, or objects, such as "restaurant", "gas station", "closest", "weather", "time", "Japanese food", or "hair salon."

The intent determination module 420 can determine or identify the task triggers 424 based on the content of the interrupt request 416. For example, the intent determination module 420 can parse the words of the interrupt request 416 to determine or identify the task triggers 424. As a specific example, for the interrupt request 416 of "is it raining in San Francisco," the intent determination module 420 can identify the task triggers 424 as "is it" "raining" and "San Francisco". The task triggers 424 can be words or content in or of the interrupt request 416.

The intent determination module 420 can determine the request intent 422 based on comparison of the task triggers 424 to trigger categories 426. The trigger categories 426 are defined as a grouping or cluster of words that are associated with an aspect of task. For example, the trigger categories 426 can be a predetermined grouping of words, a preset or default grouping of words, a learned group of words through methods such as clustering of previously used words, or a combination thereof. As a specific example, the trigger categories 426 can be a group or lists of words associated with weather, such as "foggy", "rain", "cloudy", "cold", or "hot". In another specific example, the trigger categories 426 can be a group or list of words associated with a restaurant, such as "hamburger", "food", "burger joint", or "fast food".

The intent determination module 420 can match the task triggers 424 with the trigger categories 426 to narrow or specify the scope of the interrupt task request 212. For example, the intent determination module 420 can compare the task triggers 424 to the words of the trigger categories 426 to determine whether the task triggers 424 is within the trigger categories 426. As a specific example, if the task triggers 424 includes the word "foggy", the intent determination module 420 can compare the task triggers 424 to the trigger categories 426 matching "weather."

The intent determination module 420 can combine one or more of the task triggers 424 associated with one of the trigger categories 426 to determine the request intent 422. In the above example for the interrupt request 416 of "Is it raining in San Francisco", the intent determination module 420 can identify or determine the task triggers 424 as "Is it", "raining", and "San Francisco." To continue the example, the intent determination module 420 can compare the task triggers 424 to the trigger categories 426 to determine "Is it" as the beginning of a question, "raining" as weather, and "San Francisco" as a location. To further continue the example, the intent determination module 420 can combine the task triggers 424 to determine the request intent 422 to be a request for the weather in the city of San Francisco.

The intent determination module 420 can determine the request intent 422 as an unknown intent, an incomplete intent, or an ambiguous intent. For example, the intent determination module 420 can determine the request intent 422 as the unknown intent when one or more of the task triggers 424 do not match or correspond with one of the trigger categories 426. In another example, the intent determination module 420 can determine the request intent 422 as incomplete or ambiguous when an insufficient number of the task triggers 424 are determined or identified in the content of the interrupt request 416, such as when the speech of the task requestor 214 is not clearly received.

The computing system 100 can include a notification management module 428 coupled to the intent determination module 420. The notification management module 428 is for generating and managing notifications of the system. For example, the notification management module 428 can receive the request intent 422, generate the system notification 216, including the visual component 220 and the audio component 218, for the interrupt task request 212, and manage the priority and presentation of the system notification 216. These functions will be discussed in greater detail below.

The computing system 100 can include a notification presentation module 430 coupled to the notification management module 428. The notification presentation module 430 is for presenting the notification on the device. The notification presentation module 430 can present the system notification 216 on the first device 102. For example, the notification presentation module 430 can present the audio component 218 of the system notification 216, the visual component 220 of the system notification 216, or a combination thereof on the first user interface 318 of the first device 102 of FIG. 3. As a specific example, the notification presentation module 430 can display the visual component 220 of the system notification 216 on the first user interface 318 of FIG. 3.

The first software 326 of FIG. 3 of the first device 102 of FIG. 3 can include the modules for the computing system 100. For example, the first software 326 can include the interrupt module 410, the intent determination module 420, the notification management module 428, and the notification presentation module 430.

The first control unit 312 of FIG. 3 can execute the first software 326 for the interrupt module 410 to identify the interrupt trigger of the interrupt task request 212. The first control unit 312 can execute the first software 326 for the intent determination module 420 to determine the request intent 422. The first control unit 312 can execute the first software 326 for the notification management module 428 to generate the system notification 216. The first control unit 312 can execute the first software 326 for the notification presentation module 430 to present the system notification 216 on the first user interface 318 of FIG. 3.

The second software 342 of FIG. 3 of the first device 102 of FIG. 3 can include the modules for the computing system 100. For example, the second software 342 can include the interrupt module 410, the intent determination module 420, the notification management module 428, and the notification presentation module 430.

The second control unit 334 of FIG. 3 can execute the second software 342 for the intent determination module 420 to determine the request intent 422. The second control unit 334 can execute the second software 342 for the intent determination module 420 to determine the request intent 422. The second control unit 334 can execute the second software 342 for the notification management module 428 to generate the system notification 216. The second control unit 334 can execute the second software 342 for the notification presentation module 430 to present the system notification 216 on the first user interface 318, including the device interface 210 of FIG. 2.

The modules of the computing system 100 can be partitioned between the first software 326 and the second software 342. The second software 342 can include the intent determination module 420 and the notification management module 428. The second control unit 334 can execute modules partitioned on the second software 342 as previously described.

The first software 326 can include the interrupt module 410 and the notification presentation module 430. Based on the size of the first storage unit 314 of FIG. 3, the first software 326 can include additional modules of the computing system 100. The first control unit 312 can execute the modules partitioned on the first software 326 as previously described.

The first control unit 312 can operate the first user interface 318 to present the system notification 216 or the existing notifications 542. The first control unit 312 can operate the first software 326 to operate the first user interface 318.

The computing system 100 describes the module functions or order as an example. The modules can be partitioned differently. For example, the interrupt module 410 and the intent determination module 420 can be combined. Each of the modules can operate individually and independently of the other modules. Furthermore, data generated in one module can be used by another module without being directly coupled to each other.

The modules described in this application can be hardware implementation or hardware accelerators in the first control unit 312 or in the second control unit 334. The modules can also be hardware implementation or hardware accelerators within the first device 102 or the second device 106 but outside of the first control unit 312 or the second control unit 334, respectively, as depicted in FIG. 3. However, it is understood that the first control unit 316, the second control unit 338, or a combination thereof can collectively refer to all hardware accelerators for the modules The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the display system 100 or installed as a removable portion of the display system 100.

It has been discovered that identification or recognition of the interrupt trigger 414 by the interrupt module 410 to interrupt or suspend a notification that is currently or actively being presented, such as the existing notifications 542, improves interaction between the computing system 100. Recognition or identification of the interrupt trigger 414 enables immediate receipt of the interrupt request 416 for improved interaction of the task requestor 214 with the computing system 100.

It has also been discovered that determining the request intent 422 with the intent determination module 420 improves processing of the interrupt task request 212. Determining the request intent 422 enables the computing system 100 to accurately identify the tasks or actions to be executed by the computing system 100 which improves the processing of the interrupt task request 212.

Figure 5:
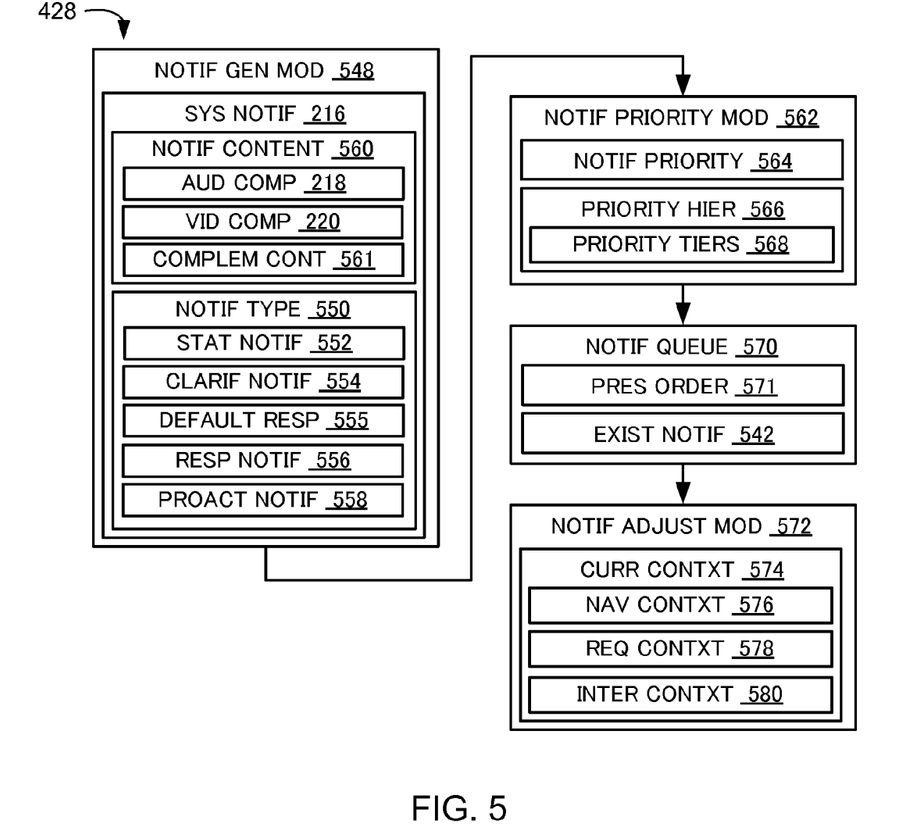
FIG. 5 is a view of the notification management module.

Referring now to FIG. 5, therein is shown a view of the notification management module 428. The notification management module 428 can generate and manage the presentation and priority of the system notification 216 of the interrupt task request 212 and the existing notifications 542. The notification management module 428 can generate the system notification 216 for the interrupt task request 212 with a notification generation module 548.

The notification generation module 548 is for generating notifications based on intent of the request. For example, the notification generation module 548 can determine one or more notification type 550 of the system notification 216 based on the request intent 422. The notification type 550 is defined as the classification of the notification that describes the type of content of the notification. For example, the notification type 550 can be a notification that updates or acknowledges the task requestor 214, provides a response to the interrupt task request 212, requests the task requestor 214 for clarification of the interrupt task request 212, provides proactive or unsolicited information associated with the interrupt task request 212, or a combination thereof. The notification generation module 548 can determine the notification type 550 as a status notification 552, a clarification notification 554, a response notification 556, a proactive notification 558, or a combination thereof, based on the request intent 422 of the interrupt task request 212.

The status notification 552 is defined as a notification that updates the user on the progress of a request. The status notification 552 can be the notification type 550 that includes information about the progress or status associated with processing or completing the interrupt task request 212. For example, the notification generation module 548 can generate the system notification 216 having the notification type 550 as the status notification 552 based on the length to time it will take to process the request intent 422. As a specific example, when the computing system 100 can require or take an extended period to process or time to respond to the request intent 422, the notification generation module 548 can generate the system notification 216 with the notification type 550 as the status notification 552.

The clarification notification 554 is defined as a notification to obtain additional information or to clarify the request. The clarification notification 554 can be the notification type 550 that responds to the interrupt task request 212 with a request for clarification or additional information. For example, the notification generation module 548 can generate the system notification 216 having the notification type 550 as the clarification notification 554 when the request intent 422 is determined as ambiguous or incomplete. As a specific example, the notification type 550 can be the clarification notification 554 when computing system 100 determines that additional information from the task requestor 214 could be used to clarify or refine the request intent 422. In another specific example, the notification type 550 can be the clarification notification 554 when the task requestor 214 does not complete the interrupt task request 212. In yet another specific example, the notification type 550 can be the clarification notification 554 when the request intent 422 is determined to beyond the scope of the computing system 100 to execute, such as the request intent 422 to report the amount of fund in a bank account when the computing system 100 does not have the clearance or ability to access the bank account information.

The clarification notification 554 can be associated with a default response 555. The default response 555 is defined as an action taken in response to the lack of response to a request for clarification. The default response 555 can be a response taken by the computing system 100 when the task requestor 214 does not respond to the clarification notification 554. For example, the default response 555 can be an automatic response by the computing system 100 when the task requestor 214 does not respond to the clarification notification 554 within a specific time period after. As a specific example, when the clarification notification 554 involves a request to choose between different routes to a destination, the default response 555 can be an automatic selection of the route most similar to the stored preference or a previous selection by the task requestor 214, such as the shortest route or the fastest route. In another specific example, when the clarification notification 554 involves a request to narrow down the type of restaurants the task requestor 214 is searching for, the default response 555 can be the presentation of all restaurants near the task requestor 214 or restaurants that the task requestor 214 prefers based on previous selections or pre-determined preferences. In a further specific example, the default response 555 can be to take no actions, including situations when the request intent 442 is ambiguous, such as not making a telephone call to an individual named "Steve" when two different people with the name "Steve" appear in the contact list of the task requestor 214.

The response notification 556 is defined as a notification for providing the response or answer to address the request of the user. The response notification 556 can be the notification type 550 including information that fulfills or addresses the interrupt task request 212. For example, the notification generation module 548 can generate the system notification 216 having the notification type 550 as the response notification 556 when the computing system 100 can provide a response that answers the request intent 422 of the interrupt task request 212.

The proactive notification 558 is defined as a notification for providing preemptive or unsolicited information or alerts. The proactive notification 558 can be the notification type 550 including unsolicited or preemptive alerts or information associated with the request intent 422 or associated with a current task to aid or assist the task requestor 214. For example, the notification generation module 548 can generate the system notification 216 having the notification type 550 as the proactive notification 558 when the information or content of the system notification 216 is not directly, specifically, or explicitly requested by task requestor 214 or is not directly associated with interrupt task request 212. As a specific example, the proactive notification 558 can be notifications that engage the task requestor 214 in a dialog or conversation to complete or solicit additional information to complete the interrupt task request 212.

The notification generation module 548 can generate a notification content 560 for the system notification 216 of the interrupt task request 212 based on the request intent 422, the notification type 550, or a combination thereof. The notification content 560 is defined as the substance or content of the notification. For example, the notification content 560 can be the words, text, sounds, images, visual effects, or a combination thereof for the system notification 216.

The notification generation module 548 can, as an example, determine the tasks, actions, or operations that the computing system 100 can execute to satisfy the request intent 422 and generate the notification content 560 of the system notification 216 that is appropriate to address the request intent 422 of interrupt task request 212. In another example, the notification generation module 548 can generate the notification content 560 corresponding with the notification type 550 and the request intent 422.

In one instance, for the request intent 422 determined as ambiguous or incomplete and the notification type 550 determined as the clarification notification 554, the notification generation module 548 can generate the notification content 560 to include content requesting further clarification. For example, the notification content 560 can include content to repeat the interrupt task request 212 or that the request intent 422 was not understood.

In another instance, for the request intent 422 determined as a request for the weather in the city of San Francisco, the notification generation module 548 can determine the notification type 550 to include the status notification 552 and the response notification 556. For example, the notification generation module 548 can generate the notification content 560 corresponding to the status notification 552 to include "Checking weather in San Francisco" to acknowledge or update the task requestor 214 while the computing system 100 is processing the request intent 422. To continue the example, the notification generation module 548 can generate the notification content 560 corresponding with the response notification 556 to include the temperature or the weather conditions in the city of San Francisco once the computing system 100 has processed the request intent 422.

In yet another instance, for the request intent 422 determined as a request for navigation or driving directions to a specific location, the notification generation module 548 can generate the notification content 560 of the system notification 216 corresponding to the notification type 550 of the proactive notification 558. For example, the notification generation module 548 can generate the notification content 560 corresponding to the proactive notification 558 to include information about parking availability when nearing the destination of a navigation session. In another example, the notification generation module 548 can generate the notification content 560 corresponding to the proactive notification 558 to include a warning or alert when traveling at a speed that exceeds the posted speed limit.

The notification generation module 548 can generate the audio component 218 system notification 216, the visual component 220 of the system notification 216, or a combination based on the notification content 560. In one example, the notification generation module 548 can generate the system notification 216 with only or primarily with the visual component 220 when the notification content 560 can be presented without audio accompaniment. As a specific example, when the request intent 422 of the interrupt task request 212 is determined as a request to view a route, the notification generation module 548 can generate the system notification 216 with only the visual component 220 including a visual depiction of the entire route. In another example, the notification generation module 548 can generate the spoken portion of the audio component 218 and text used in the visual component 220 that is consistent with the language preference of the task requestor 214.

Optionally, the notification generation module 548 can generate the system notification 216 only the audio component 218 or only the visual component 214 based on the preference or previous use of the task requestor 214. For example, the task requestor 214 can explicitly instruct or set a preference for generation of the system notification 216 with only the audio component 218 or only the visual component 214. In another example, the notification generation module 548 can infer preference of only the audio component 218 or only the visual component 214 through repeated actions by the task requestor 214, such as the task requestor 214 consistently muting the audio component 218 in specific situation.

In another example, the notification generation module 548 can generate the system notification 216 with only or primarily with the audio component 218 when the notification content 560 can be presented without visual accompaniment. As a specific example, when the request intent 422 of the interrupt task request 212 is determined as an inquiry for accidents along a route, the notification generation module 548 can generate the system notification 216 with only the audio component 218 when there are no accidents or traffic.

In a further example, the notification generation module 548 can generate the system notification 216 with the audio component 218, the visual component 220, or a combination thereof to include complementary content 561. The complementary content 561 is defined as content of the notification that is complementary but not redundant when presented through multiple presentation means or formats, such as audio or video. In one instance, the audio component 218 can be generated with the complementary content 561 to be non-redundant with the visual component 220. In another instance, the visual component 220 can be generated with the complementary content 561 to be non-redundant with the audio component 218. In a further instance, the audio component 218 and the visual component 220 can both be generated to include the complementary content 561 that is mutually non-redundant.

For example, when the request intent 422 of the interrupt task request 212 is determined as a request to view a route, the notification generation module 548 can generate the system notification 216 with the visual component 220 depicting the entire route and the audio component 218 stating "The route to your destination is clear" or "Your estimated arrival time is 6:35 pm." In another example, when the request intent 422 of the interrupt task request 212 is determined as a request to notify the task requestor 214 when driving over the speed limit, the notification generation module 548 can generate the system notification 216 with the audio component 218 stating "slow down" or "exceeding the speed limit," and the visual component 220 with a flashing red screen to indicate speeding or the with the current speed flashing on a display of the device interface 210.

The notification generation module 548 can synchronize the complementary content 561 for the audio component 218 and the visual component 220. For example, the notification generation module 548 can synchronize the audio component 218 and the visual component 220 associated with the same one of the system notification 216 through simultaneous presentation. As a specific example, the audio component 218 and the visual component 220 can be synchronized through simultaneous presentation by presenting both the audio component 218 and the visual component 220 for the same duration. For instance, the audio component 218, presented as an earcon, can be played repeatedly or continuously for the duration of the presentation of the visual component 220. In another instance, for the audio component 218 as a spoken notification, the visual component 220 can be displayed or presented during the entire duration of audio component 218.

The notification management module 428 can include a notification priority module 562, coupled to the notification generation module 548. The notification priority module 562 is for managing the priority of notifications associated with the task request and other notifications. The notification priority module 562 can manage the priority of the system notification 216 associated with the interrupt task request 212 and the existing notifications 542 based on a notification priority 564 for the interrupt task request 212 and the existing notifications 542.

The notification priority 564 is defined as the priority in which a notification will be presented by the system. For example, the notification priority 564 can determine the order in which the existing notifications 542 and the system notification 216 associated with the interrupt task request 212 will be presented on the first device 102 of FIG. 2. As a further example, the notification priority 564 for the existing notifications 542 can be determined prior receiving the interrupt task request 212.

The notification priority module 562 can generate the notification priority 564 for the system notification 216 of the interrupt task request 212 based on a priority hierarchy 566. The priority hierarchy 566 is defined as a list or grouping of tasks or operations arranged based on urgency, importance, priority, or a combination thereof.

The priority hierarchy 566 can include priority tiers 568. The priority tiers 568 are defined as an ordering or groupings of tasks or operations based on priority. For example, the priority tiers 568 can be arranged or classified according to priority with varying degrees of granularity or stratification. As a specific example, the priority tiers 568 can include a single task or operation or can include groups of tasks or operations, such as navigation prompts or search requests.

The priority tiers 568 can be classified in general groupings, such high priority, intermediate priority, or low priority. In another specific example, the priority tiers 568 can be associated with a task or operation executable by the computing system 100 that can be assigned a specific priority relative to the other tasks or operations, such as a numerical value between 1 and 100, with 1 representing the highest priority and 100 representing the lowest priority.

The priority tiers 568 of the priority hierarchy 566 can be set or determined in a number of different ways. For example, the priority tiers 568 for the tasks or operations of the priority hierarchy 566 can be a default setting. As a specific example, the default setting for the priority hierarchy 566 can be such that the priority tiers 568 associated with the currently task, operation, or active application, such as the navigation application, can have a higher priority value over the priority tiers 568 that are not associated with the currently task, operation, or active application, such as a request for the weather. In another specific example, the specific one of the priority tiers 568 associated with emergencies, such as a request to dial or call "911", can have the highest priority relative to other ones of the priority tiers 568.

In another example, the priority tiers 568 of the priority hierarchy 566 can be set or determined based on preferences of the task requestor 214. As a specific example, the specific priority level or value for the tasks or operations associated with the priority tiers 568 can be determined learned or observed based on the previous actions and behavior of the task requestor 214, such as when the task requestor 214 repeatedly changes or overrides the priority of one of the existing notifications 542 or the system notification 216. In another specific example, priority level or value for the priority tiers 568 can be manually or explicitly determined by the task requestor 214, such as prioritizing tasks or operations related to receiving incoming email or text messages over those related to navigation.

The priority tiers 568 of the priority hierarchy 566 can include priority ordering of the notification type 550 associated with the request intent 422. For example, the priority hierarchy 566 can have one of the notification type 550 with the notification priority 564 that is higher than the notification priority 564 of another type of the notification type 550. As a specific example, the response notification 556 can be of the highest of the priority tiers 568, followed by the status notification 552, the clarification notification 554, and with the proactive notification 558 of the lowest of the priority tiers 568. However, it is understood that the notification type 550 can be ordered differently, such as the proactive notification 558 being of a higher one of the priority tiers 568 relative to that of the clarification notification 554.

The notification priority module 562 can generate the notification priority 564 for the system notification 216 of the interrupt task request 212 based on comparing the request intent 422 with the priority hierarchy 566. For example, the notification priority module 562 can compare and match the request intent 422 with the priority tiers 568 of the priority hierarchy 566 that includes the task or operation of the request intent 422. To continue the example, the notification priority module 562 can generate the notification priority 564 as the priority level or priority value of the priority tiers 568 matching the request intent 422.

In another example, the notification type 550 can be included as a subset of the each of the priority tiers 568. To continue the example, the notification priority module 562 can generate the notification priority 564 for the system notification 216 by the request intent 422 and the notification type 550. As a specific example, the notification priority module 562 can generate the notification priority 564 for the system notification 216 first based on the request intent 422 followed by the notification type 550. For instance, a particular one of the request intent 422 can include the system notification 216 of the proactive notification 558 and the response notification 556, where the proactive notification 558 can have a lower priority value of the notification priority 564 relative to the response notification 556.

The notification priority module 562 can manage priority by determining the presentation order 571 of the existing notifications 542 and the system notification 216 of the interrupt task request 212 with a notification queue 570. The presentation order 571 is defined as the order that notifications are presented.

The notification queue 570 is defined as an ordered list of notifications based on priority for presentation by the system. For example, the notification queue 570 can be a list of all the existing notifications 542 arranged according to the notification priority 564. As a specific example, the existing notifications 542 can be arranged in descending value according to the notification priority 564 associated with the respective one of the existing notifications 542.

The notification priority module 562 can enter the system notification 216 for the interrupt task request 212 into the notification queue 570 based on the notification priority 564. For example, the notification priority module 562 can compare the notification priority 564 of the system notification 216 to the notification priority 564 of the existing notifications 542 and enter or place the system notification 216 into the notification queue 570 before or after one of the existing notifications 542 based on the value of the notification priority 564.

The notification management module 428 can adjust or modify the order of the existing notifications 542 and the system notification 216 with a notification adjustment module 572, coupled to the notification generation module 548. For example, the notification adjustment module 572 can adjust or modify the notification priority 564, the notification content 560 or a combination thereof for the system notification 216, the existing notifications 542, or a combination thereof based on a current context 574.

The current context 574 is defined as the circumstances associated with the notification. For example, the current context 574 can include the situation that occur during or proximate to the time the interrupt task request 212 was made, preferences or use history of the task requestor 214, information based on the interaction between the computing system 100 and the task requestor 214, or a combination thereof. The current context 574 can include a navigation context 576, a requestor context 578, an interaction context 580, or a combination thereof.

The navigation context 576 is defined as circumstances, situations or occurrences associated with navigation along a route. For example, the navigation context 576 can include circumstances such as the location of task requestor 214, factors associated with or related to the vehicle of the task requestor 214, navigation along a route, or events occurring during a navigation.

The requestor context 578 is defined as factors associated with the requestor of a task. For example, the requestor context 578 can include factors, such as preferences of the task requestor 214, usage history of the task requestor 214, and features available to the task requestor 214, such as subscription based content.

The interaction context 580 is defined as information associated with processing a notification or a request. For example, the interaction context 580 can include the time it will take for the computing system 100 to process or execute the request intent 422 of the interrupt task request 212, the duration or length of the system notification 216 or the existing notifications 542, or the time between the system notification 216 and the existing notifications 542.

As an example, the notification adjustment module 572 can adjust the notification priority 564 for the system notification 216 or the existing notifications 542 based on the current context 574 by increasing or decreasing the value of the notification priority 564. Changing or adjusting the notification priority 564 of the system notification 216 or the existing notifications 542 can change the position of the system notification 216 or the existing notifications 542 in the notification queue 570.

The notification adjustment module 572 can modify or adjust the notification content 560 of the system notification 216, the existing notifications 542, or a combination thereof when the notification priority 564 is modified, adjusted or changed based on the current context 574. In one instance, the notification adjustment module 572 can alter or modify the notification content 560 of the system notification 216 or the existing notifications 542. For example, the notification adjustment module 572 can increase or decrease the play out speed of the audio component 218 of the system notification 216 or the display duration the visual component 220 of the system notification 216. In another example, the notification adjustment module 572 can change the notification content 560 by removing or adding words used in the audio component 218 or changing the spoken portion of the audio component 218 to an earcon or sound effect that can have a predefined or specific meaning. In yet another example, the notification adjustment module 572 can adjust the audio component 218 without changing the words or spoken portion of the notification content 560, such as introducing the earcon or sound effect before, during, or after the spoken portion of the notification content 560.

In another instance, the notification adjustment module 572 can overlap or combine the system notification 216 or the existing notifications 542 with other instances of the existing notifications 542. For example, the notification adjustment module 572 can overlap the system notification 216 or one of the existing notifications 542 with another one of the existing notifications 542 by presenting the audio component 218 or the visual component 220 of the one of the system notification 216 contemporaneously with the visual component 220 or audio component 218 of one of the existing notifications 542. As a specific example, the notification adjustment module 572 can present only the audio component 218 of the system notification 216 while presenting only the visual component 220 of one of the existing notifications 542.

In another instance, the notification adjustment module 572 can skip the system notification 216 or existing notifications 542. For example, the notification adjustment module 572 can remove the system notification 216 or the existing notifications 542 from the notification queue 570.

The physical transformation from receiving the interrupt task request 212 to generate the system notification 216 results in the movement in the physical world, such as people using the first device 102 based on the operation of the computing system 100. As the movement in the physical world occurs, the movement itself creates additional information that is converted back into the current context 574 for modifying the notification content 560 of the system notification 216 for the continued operation of the computing system 100 and to continue the movement in the physical world.

It has been discovered that determining the notification priority 564 based on the request intent 422 and the notification types 550 improves accuracy of the notification priority 564. The notification priority module 560 can refine the relative priority of the system notification 216 associated with the request intent 422 and the notification types 550, which improves the accuracy of the notification priority 564.

It has also been discovered that modification of the notification content 560 based on the change in the notification priority 564 with the current context 574 improves presentation efficiency of the system notification 216. The modification of the visual component 220 of the system notification 216, the audio component 218 of the system notification 216, or a combination thereof, enables contemporaneous presentation with one of the existing notifications 542, which improves presentation efficiency.

Figure 6:
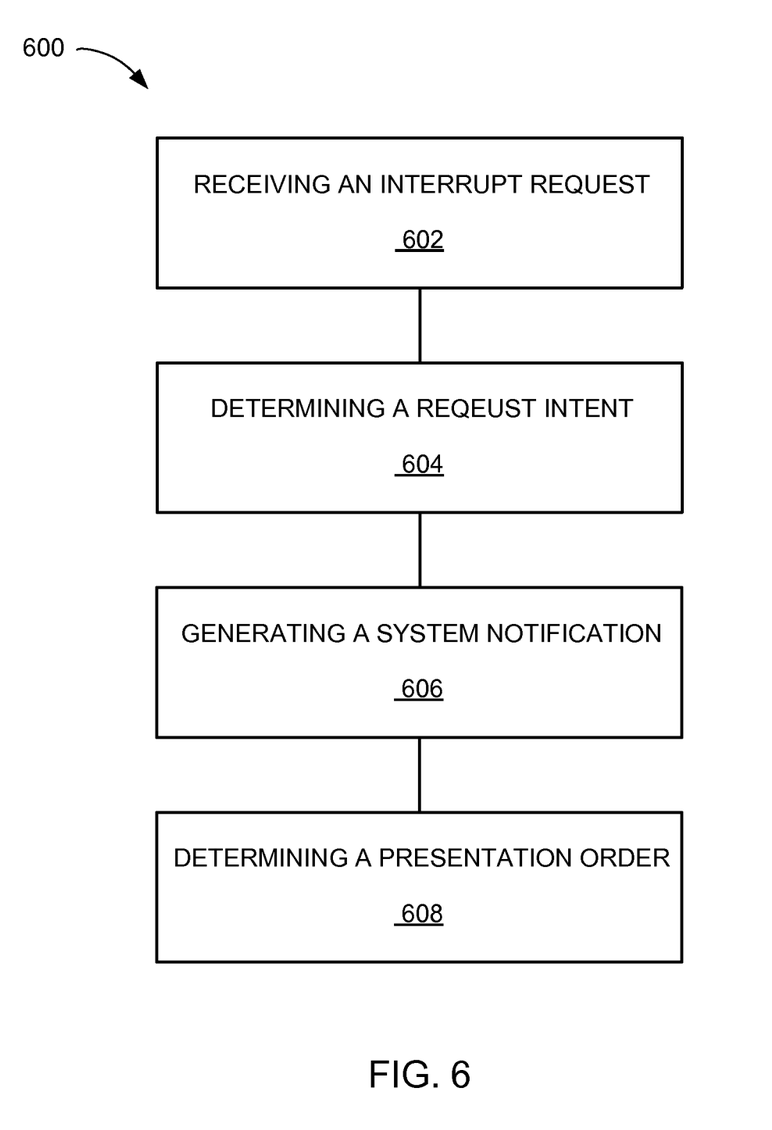
FIG. 6 is a flow chart of a method of operation of the computing system in a further embodiment of the present invention.

Referring now to FIG. 6, therein is shown a flow chart of a method 600 of operation of the computing system 100 in a further embodiment of the present invention. The method 600 includes: receiving a interrupt request for an interrupt task request in a block 602; determining a request intent, with a control unit, from the interrupt request in a block 604; generating a system notification for the interrupt task request based on the request intent in a block 606; and determining a presentation order of the system notification relative to an existing system notification based on a notification priority associated with the interrupt task request in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a computing system comprising:
   receiving an interrupt request for an interrupt task request;
   determining a request intent, with a control unit, from the interrupt request;
   generating a system notification for the interrupt task request based on the request intent;
   determining a presentation order of the system notification relative to an existing system notification based on a notification priority for the interrupt task request; and
   modifying a notification content of the system notification, including overlapping the system notification and the existing notification, based on an adjustment to the notification priority of the system notification.

2. The method as claimed in claim 1 wherein receiving the interrupt request includes receiving the interrupt request following identification of an interrupt trigger of the interrupt task request.

3. The method as claimed in claim 1 wherein determining the request intent includes determining the request intent based on identification of a task trigger in the interrupt request.

4. The method as claimed in claim 1 wherein modifying the notification content includes modifying the notification content of the system notification when the notification priority for the system notification is adjusted based on a current context.

5. The method as claimed in claim 1 wherein generating the system notification includes generating the system notification with an audio component, a visual component, or a combination thereof having complementary content.

6. The method as claimed in claim 1 further comprising generating the notification priority of the system notification based on the request intent and a notification type of the system notification.

7. The method as claimed in claim 1 further comprising combining the presentation of the system notification and the existing notification.

8. A computing system comprising:
   a control unit configured to:
      receive an interrupt request for an interrupt task request;
      determine a request intent, with a control unit, from the interrupt request;
      generate a system notification for the interrupt task request based on the request intent;
      determine a presentation order of the system notification relative to an existing system notification based on a notification priority for the interrupt task request;
      modify a notification content of the system notification, including overlapping the system notification and the existing notification, based on an adjustment to the notification priority of the system notification; and
   a user interface, coupled to the control unit, configured to present the system notification.

9. The system as claimed in claim 8 wherein the control unit is configured to receive the interrupt request following identification of an interrupt trigger of the interrupt task request.

10. The system as claimed in claim 8 wherein the control unit is configured to determine the request intent based on identification of a task trigger in the interrupt request.

11. The system as claimed in claim 8 wherein the control unit is configured to modify the notification content of the system notification when the notification priority for the system notification is adjusted based on an current context.

12. The system as claimed in claim 8 wherein the control unit is configured to generate the system notification with an audio component, a visual component, or a combination thereof having complementary content.

13. The system as claimed in claim 8 wherein the control unit is configured to generate the notification priority of the system notification based on the request intent and a notification type of the system notification.

14. The system as claimed in claim 8 wherein the control unit is configured to combine the presentation of the system notification and the existing notification.

15. A non-transitory computer readable medium including instructions for operating a computing system comprising:
   receiving an interrupt request for an interrupt task request;
   determining a request intent, with a control unit, from the interrupt request;
   generating a system notification for the interrupt task request based on the request intent;
   determining a presentation order of the system notification relative to an existing system notification based on a notification priority for the interrupt task request; and
   modifying a notification content of the system notification, including overlapping the system notification and the existing notification, based on an adjustment to the notification priority of the system notification.

16. The non-transitory computer readable medium as claimed in claim 15 wherein receiving the interrupt request includes receiving the interrupt request following identification of an interrupt trigger of the interrupt task request.

17. The non-transitory computer readable medium as claimed in claim 15 wherein determining the request intent includes determining the request intent based on identification of a task trigger in the interrupt request.

18. The non-transitory computer readable medium as claimed in claim 15 wherein modifying the notification content includes modifying the notification content of the system notification when the notification priority for the system notification is adjusted based on a current context.

19. The non-transitory computer readable medium as claimed in claim 15 wherein generating the system notification includes generating the system notification with an audio component, a visual component, or a combination thereof having complementary content.

20. The non-transitory computer readable medium as claimed in claim 15 further comprising generating the notification priority of the system notification based on the request intent and a notification type of the system notification.

21. The non-transitory computer readable medium as claimed in claim 15 further comprising combining the presentation of the system notification and the existing notification.

* * * * *